(12) United States Patent
Stehle

(10) Patent No.: US 12,109,515 B2
(45) Date of Patent: Oct. 8, 2024

(54) FILTER DEVICE

(71) Applicant: RT-FILTERTECHNIK GMBH, Friedrichshafen (DE)

(72) Inventor: Gerhard Stehle, Constance (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 416 days.

(21) Appl. No.: 17/627,919

(22) PCT Filed: Jul. 15, 2020

(86) PCT No.: PCT/EP2020/069966
§ 371 (c)(1),
(2) Date: Jan. 18, 2022

(87) PCT Pub. No.: WO2021/013648
PCT Pub. Date: Jan. 28, 2021

(65) Prior Publication Data
US 2022/0258076 A1    Aug. 18, 2022

(30) Foreign Application Priority Data

Jul. 25, 2019 (DE) .................. 10 2019 005 323.0
Jul. 25, 2019 (DE) .................. 10 2019 005 324.9
(Continued)

(51) Int. Cl.
*B01D 29/23* (2006.01)
*B01D 29/60* (2006.01)
(Continued)

(52) U.S. Cl.
CPC ........... *B01D 29/23* (2013.01); *B01D 29/606* (2013.01); *B01D 35/0276* (2013.01);
(Continued)

(58) Field of Classification Search
CPC .... B01D 29/23; B01D 29/606; B01D 29/232; B01D 35/0276; B01D 35/147;
(Continued)

(56) References Cited

U.S. PATENT DOCUMENTS 4,626,348 A  * 12/1986 Stone ................... B01D 36/003
                                                         210/248
5,753,117 A     5/1998 Jiang
(Continued)

FOREIGN PATENT DOCUMENTS

DE        2 335 276       2/1974
DE    10 2010 049 974     4/2012
(Continued)

OTHER PUBLICATIONS

International Search Report (ISR) issued Oct. 2, 2020 in International (PCT) Application No. PCT/EP2020/069966.

*Primary Examiner* — Liam Royce
(74) *Attorney, Agent, or Firm* — WENDEROTH, LIND & PONACK, L.L.P.

(57) ABSTRACT

A filter device with a filter housing (2, 6), in which a replaceable filter element (4) is accommodated and which has a cover part (2). Element material (30) is delimited at the end by at least one end cap (32). This end cap (32) of the filter element (4) is placed on a fluid channel (58). A device (84) for transverse force support for the filter element (4) is provided between this one end cap (32) and the fluid channel (58). The device (84) for transverse force support supports the filter element (4) in relation to the fluid channel (58) engaging in the interior of the filter element (4) at least partially at the end.

16 Claims, 3 Drawing Sheets

(30) Foreign Application Priority Data

Jul. 25, 2019 (DE) .................. 10 2019 005 325.7
Jul. 25, 2019 (DE) .................. 10 2019 005 326.5

(51) Int. Cl.
*B01D 35/027* (2006.01)
*B01D 35/147* (2006.01)
*B01D 35/30* (2006.01)

(52) U.S. Cl.
CPC ........... B01D 35/147 (2013.01); B01D 35/30 (2013.01); *B01D 2201/0423* (2013.01); *B01D 2201/291* (2013.01); *B01D 2201/295* (2013.01); *B01D 2201/304* (2013.01); *B01D 2201/305* (2013.01); *B01D 2201/309* (2013.01); *B01D 2201/4007* (2013.01); *B01D 2201/4015* (2013.01); *B01D 2201/4084* (2013.01)

(58) Field of Classification Search
CPC .................. B01D 35/30; B01D 35/153; B01D 2201/0423; B01D 2201/291; B01D 2201/295; B01D 2201/304; B01D 2201/305; B01D 2201/309; B01D 2201/4007; B01D 2201/4015; B01D 2201/4084; B01D 2201/4076; B01D 2201/0446; B01D 2201/301; F01M 11/03; F02M 37/36; F02M 37/42; F02M 37/50; F02M 37/22

See application file for complete search history.

(56) References Cited

U.S. PATENT DOCUMENTS

| | | | |
|---|---|---|---|
| 2003/0222006 A1* | 12/2003 | Cella | B01D 29/925 210/295 |
| 2013/0228507 A1 | 9/2013 | Schmitt et al. | |
| 2018/0257012 A1 | 9/2018 | Maurer et al. | |
| 2018/0333663 A1 | 11/2018 | Vogt | |

FOREIGN PATENT DOCUMENTS

| | | |
|---|---|---|
| DE | 10 2015 003 604 | 9/2016 |
| DE | 10 2015 012 558 | 3/2017 |
| DE | 10 2016 001 025 | 8/2017 |
| DE | 10 2016 006 833 | 12/2017 |
| DE | 10 2016 013 588 | 5/2018 |
| DE | 10 2017 011 523 | 6/2019 |
| EP | 2 201 993 | 6/2010 |
| JP | 2009-214003 | 9/2009 |
| WO | 2004/080568 | 9/2004 |
| WO | 2008/030707 | 3/2008 |
| WO | 2015/173624 | 11/2015 |

* cited by examiner

FILTER DEVICE

FIELD OF THE INVENTION

The invention relates to a filter device with a filter housing, in which a replaceable filter element is accommodated and which has a cover part. The element material is delimited at the end by at least one end cap.

BACKGROUND OF THE INVENTION

Filter devices of this type in a variety of embodiments and having replaceable filter elements that comply with different specifications are state of the art. The filter elements are used in such filtering devices for the maintenance of fluids, in particular in hydraulic systems. As shown in the document DE 10 2015 003 604 A1, which discloses a filter device of the genus mentioned above, such filter devices can advantageously be designed as in-tank filter devices. In such solutions, the filter element extends, starting from the cover part, which forms the closure of a wall opening of a container or tank storing the fluid, into the interior of the tank. The length of the filter element is such that the lower end cap is located below the lowest fluid level expected during operation. In filtration mode, the unfiltered matter enters the inner filter cavity of the filter element through an opening in the lower end cap. After flowing through the element material from the inside to the outside, the fluid reaches the inside of the tank as filtrate.

SUMMARY OF THE INVENTION

Based on this state of the art, the invention addresses the problem of providing a filter device of the genus mentioned above, which is characterized by a particularly effective operational behavior.

According to the invention, this problem is basically solved by a filter device having, as t an essential feature of the invention, one end cap of the filter element placed on a fluid channel. Also, a device for transverse force support for the filter element is provided between this one end cap and the fluid channel. The device for transverse force support supports the filter element in relation to the fluid channel engaging in the interior of the filter element least partially at the end. When the filter device is installed in a container or tank and the fluid channel is anchored in the tank, for instance by fastening to the tank bottom, the transverse force support effective between the end cap and the fluid channel, forms a safeguard against displacement or twisting the filter element because of forces acting on its outside. Similar loads result, for instance, when the device is used with mobile working equipment, wherein flow forces due to the fluid sloshing caused by motions of the tank can act on the filter element, as can dynamic loads due to acting acceleration forces.

In a preferred embodiment of the filter device according to the invention, provision is made for the end cap to comprise the device for transverse force support, which is preferably connected to the end cap in the form of an insert part. In this way, the device for transverse force support can be connected to the end cap as one termination of the element material in a particularly favorable manner in terms of manufacturing technology. Solutions, in which the device for transverse force support is an integral part of the assignable end cap, are also conceivable.

In a further preferred embodiment of the device according to the invention, provision is made for the device for transverse force support to be formed from a sleeve, which on one end has a turned-in rim and on the other end forms a perimeter wall as part of a guide for the fluid channel. A bar-shaped annular flange is formed at the outer circumference of the perimeter wall and engages with a step-shaped recess in the one end cap.

For improved guidance, provision can also advantageously be made for the perimeter wall to taper slightly in the direction of its inwardly turned-in rim to ensure an improved contact pressure position on the outer circumference of the fluid channel.

In particularly advantageous exemplary embodiments, provision is made for the turned-in rim of the sleeve to form a kind of stop body as part of the transverse force support, which forms a possible end stop for the filter element with respect to the stationary fluid channel, The stationary fluid channel preferably projects into the interior of the tank housing. In this way, a safety device is formed to prevent the filter element from falling unintentionally into the tank, which can be the case in particular when the element is detached for removal purposes from the cover at its opposite end. Furthermore, the stop body forms a possible end stop when the filter element is placed on the outer circumference of the fluid channel.

Preferably, the free inner diameter delimited by the turned-in rim is smaller than the free inner diameter of the fluid channel in the area of its adjacent free end.

Advantageously, the arrangement may further be such that the one free end of the element material facing the one end cap is in planar contact with a part of the one end cap, adjacent to the recess and the bar-shaped annular flange of the stop body. As a result, the free front end of the element material is supported at both sides in a planar manner.

In advantageous exemplary embodiments, as a further part of the guide device, projecting receiving ridges are formed on the end cap, wherein the conically converging guide surfaces of the receiving ridges point in the direction of the receiving opening for the engagement of the fluid channel. The tapered guide surfaces thus form a funnel-shaped insertion aid when the end cap is placed on the fluid channel.

For the purpose of obtaining a seal between the end cap with the device for transverse force support and the fluid channel engaging in the filter element at the end, a circumferential sealing lip is provided on the relevant end cap. The sealing lip encloses the fluid channel with a predeterminable contact force.

Preferably, the sealing lip can be provided as a further part of the device for transverse force support, which on the one hand encloses the fluid channel as a seal with its predeterminable contact force and on the other hand simultaneously rests against the device for transverse force support.

For improved sealing, provision is further made for the sealing lip to protrude towards the interior of the filter element with a radial protrusion that decreases as the fluid channel engages with the end cap. With particular advantage, the sealing lip can be an integral part of one end cap and be elastically flexible. Advantageously, the sealing lip can made of a plastic having elastic properties, wherein the sealing lip is an integral part of the end cap or can be molded thereto.

For improved sealing, provision is advantageously made for the free rim of the circumferential sealing lip to have a smaller diameter than the outer diameter of the fluid channel in the initial state before engagement of the fluid channel in the end cap. To allow improved insertion of the fluid channel into the assigned end cap, provision can advantageously be made for the angle of taper of the guide ridges to match the angle of taper of the inwardly projecting sealing lip.

Other objects, advantages and salient features of the present invention will become apparent from the following detailed description, which, taken in conjunction with the drawings, a discloses preferred embodiment of the present invention.

BRIEF DESCRIPTION OF THE DRAWINGS

Referring to the drawings that form a part of this disclosure.

DETAILED DESCRIPTION OF THE INVENTION

Figure 1:
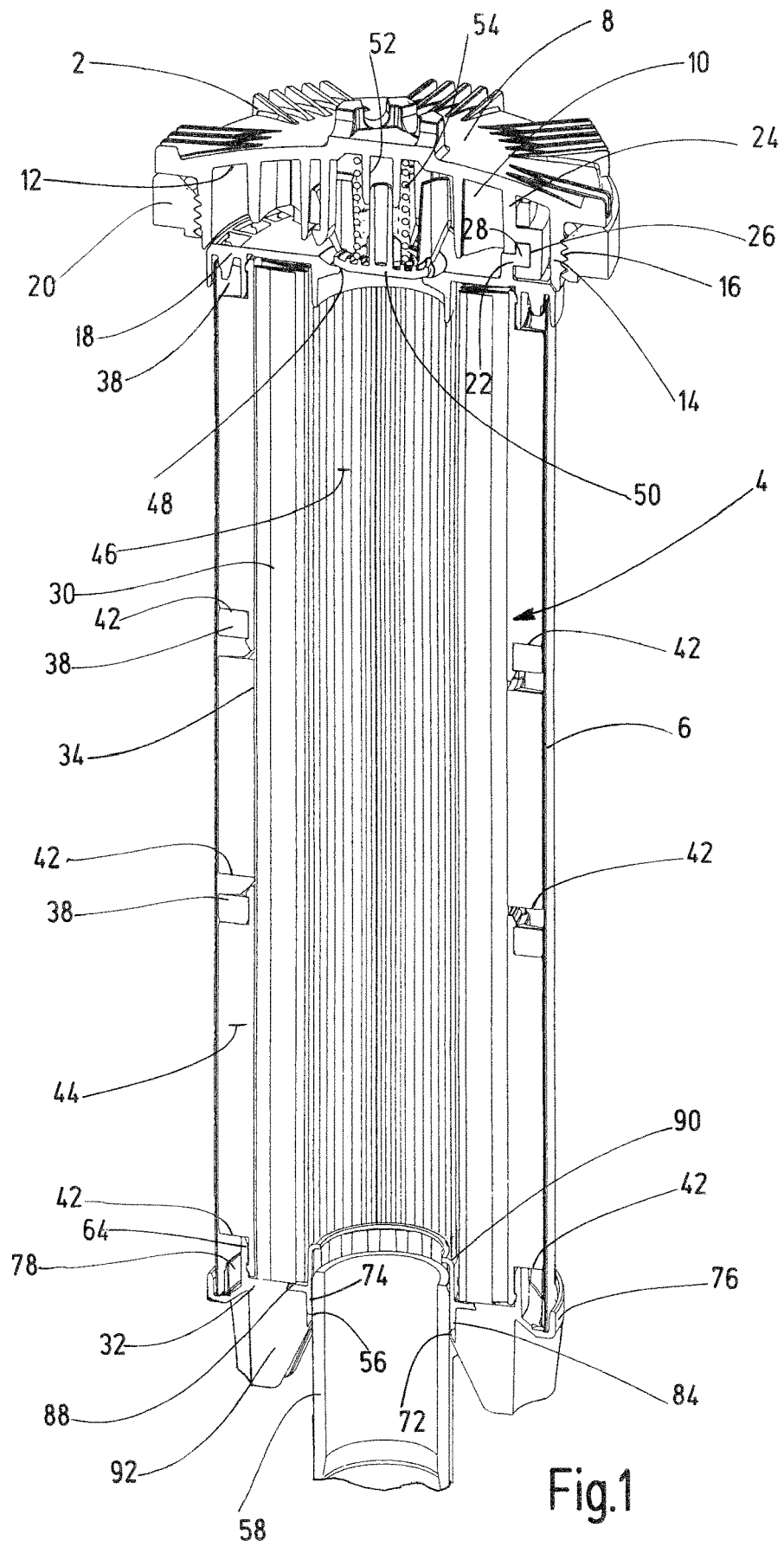
FIG. 1 is a perspective oblique view in section in a vertical central plane of an exemplary embodiment of a filter device according to the invention.

FIG. 1 shows a filter device according to an exemplary embodiment of the invention designed as an in-tank filter device, in its entirety, with a cover part 2. In conjunction with an outflow pipe 6 forming the outer shell of a filter element 4, the cover part 2 forms the filter housing of the filter device. The circular cover part 2 has a slightly convex top 8 and a trough-shaped interior 10, the bottom 12 of which has a concave curvature matching the curvature of the top 8. Laterally, the interior 10 is delimited by a cylindrical side wall 14, which has an external thread 16. For installation of the filter device in a tank (not shown), the external thread 16 of the side wall 14 of the cover part 2 is screwable with a mounting flange 20, which is located at the wall opening in an upper tank wall of the tank in question.

To form a detachable connection between the cover part 2 and the filter element 4 as the further housing part, the filter element 4 has on an upper end cap 18 a locating device, which can be brought into positive engagement with a holding means or holder located in the interior 10 of the cover part. The locating device or locator of the end cap 18 has on its upper side near its outer circumference three locating bars 22 offset at an angular distance of 120° from each other, only one of which is visible in FIG. 1. For each locating bar 22, on the bottom 12 of the interior space 10 of the cover part 2, a holding body 24 is formed, in which a blocking channel 26 extending along an arcuate section is located. Into the blocking channel 26, a blocking strip 28 angled away from the assigned locating bar 24, can enter into the fixed position shown in FIG. 1 by a relative rotary motion between the filter element 4 and the cover part. This forms a type of bayonet lock for a form-fitting interlock.

The filter element 4 has a hollow cylindrical element material 30 extending between the upper end cap 18 and a lower end cap 32 in the usual manner. The end caps 18 and 32, in conjunction with the element material 30, also accommodate the ends of a support tube 34 and of the outflow pipe 6, which is provided with a perforation 36 (see FIGS. 2 and 3) allowing the passage of fluid. The support tube 34 is formed by a grid-shaped, fluid-permeable support structure having annular segments 38, which lie in spaced-apart radial planes, and longitudinal bars 40 connecting the annular segments 38 (FIG. 3).

Between the annular segments 38, circumferentially distributed wings 42 in the form of flat strips extend as spacers to the inner side of the discharge pipe 6, such that an intermediate space 44 is formed between the outer side of the element material 30 and the discharge pipe 6. In filtration mode, in which the fluid flows outwards from the inner filter cavity 46 through the element material 30, the intermediate space 44 forms the filtrate side of the filter device, from which the filtrate emerges into the interior of the tank via the perforation 36 of the outflow pipe 6.

The upper end cap 18 has a central opening 48 that provides a possible passage from the filter cavity 46 to the interior 10 of the cover part 2, but is normally closed by the closing body 50 of a bypass valve located in the cover interior 10.

The bypass valve has a guide sleeve 52 projecting coaxially from the bottom 12 of the cover part 2, wherein in the guide sleeve 52 a stem of the closing body 50 is displaceably guided. The bypass valve has a compression spring 54 encompassing the sleeve 52. The compression spring 54 pre-loads the closing body 50 into the closed position and is clamped between the closing body 50 and the bottom 12.

Figure 2:
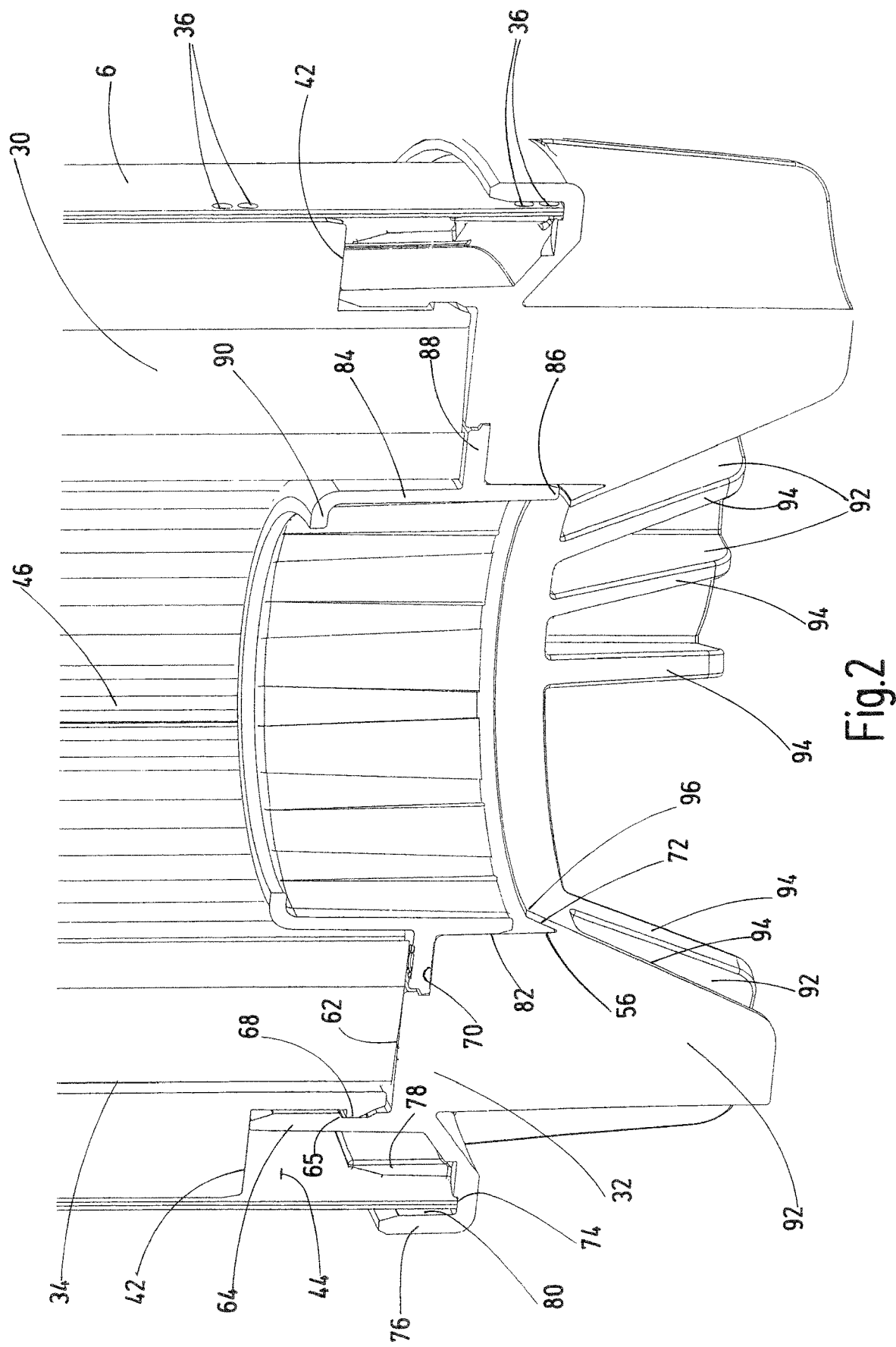
FIG. 2 is an enlarged partial perspective view in section taken in a vertical central sectional plane, of only the lower end part of the exemplary embodiment.
Figure 3:
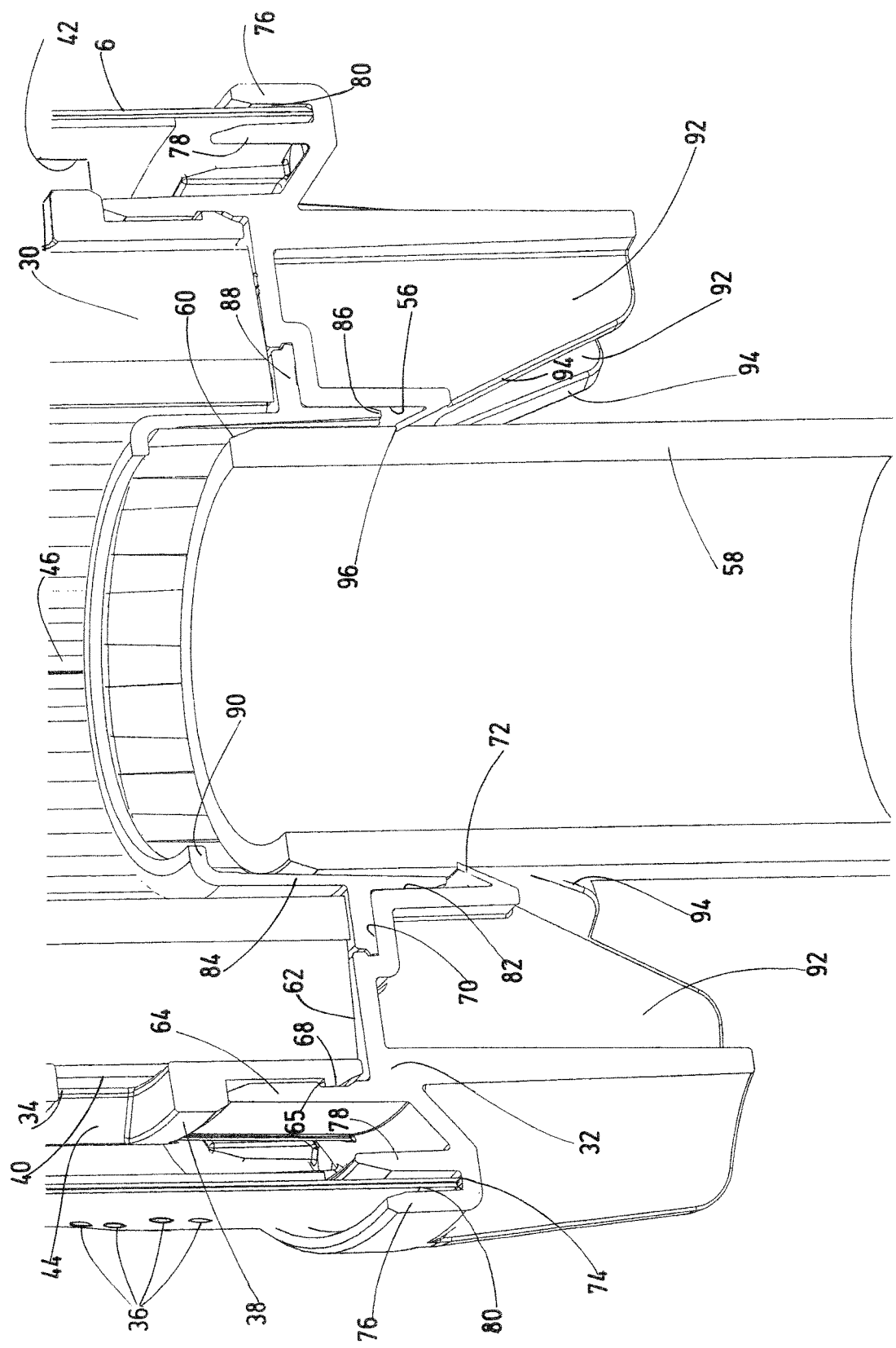
FIG. 3 is an enlarged partial perspective view in section taken in a vertical central sectional plane of the lower end part of the exemplary embodiment, mounted on a fluid channel.

FIGS. 2 and 3 show more details of the exemplary embodiment in the area of the lower end cap 32. It has a central opening 56 for the inflow of unfiltered matter into the inner filter cavity 46. For the supply of the unfiltered matter, a fluid channel in the form of a pipe socket 58 is provided at the bottom area of the tank (not shown). The pipe socket 58 is anchored in a fixed position and has a rounded end rim 60 at the free end. As an enclosure for the facing ends of the element material 30 and the support tube 34, the lower end cap 32 has on its upper side a flat contact surface 62, which is radially delimited on the outside by a peripheral rim 64 projecting axially upwards. The rim 64 has on the inside a latching notch 65, into which a latching lug 68 of the support tube 34 can be latched, to axially secure the support tube 34 to the end cap 32. Adjoining to the peripheral rim 64 in a radially inward direction, the contact surface 62 has a planar section adjoined at the radially inner end by a step-shaped, deepened recess 70, which forms the transition to the opening 56.

At the end of the central opening 56, wherein this end is offset axially downwards from the recess 70, the end cap 52 forms an integrally, circumferential sealing lip 72 that, in cross-section, has the shape of a thin tongue that, splayed from the wall of the opening 56, extends obliquely inwards and upwards toward the filter element 4. In accordance with the elastic properties of the plastic material forming the end cap 32, the sealing lip 72 is elastically flexible. In the circumferential area adjoining the peripheral rim 64 radially outwards, the end cap 52 forms a recessed channel 74, in which between an outer peripheral rim 76 and an inner annular body 78 a slot-shaped annular space 80 is formed, in which the outflow pipe 6 is received in an inserted manner.

On its underside, the end cap 32 continues downwards, adjoining to the recess 70, in a channel-shaped section 82, at the end of which the sealing lip 72 is formed. The channel section 82, in conjunction with a guide sleeve 84, forms the guide for the pipe socket 58, which extends through the opening 56 of the end cap 32 into the inner filter cavity 46 when the filter element 4 is fitted. The sleeve 84 has an annular flange 88 projecting radially outwards above lower end 86 of the sleeve 84 and is received in the opening 56 of the end cap 32 such that the annular flange 88 is received in the recess 70 in a fitting manner, such that the top side of the annular flange 88 is aligned with the plane of the encompassing abutment surface 62. The other upper end of the sleeve 84 has an inward crimping 90 that forms a stop body for the upper end rim 60 of the pipe socket 58.

To form an insertion aid when the filter element 4 is placed in position, the end cap 32 has, as a guide device or guide adjoining the lower end of the opening 56, a ring of integrally formed, circumferentially distributed, wing-shaped guide ridges 92 projecting axially downwards, the radially inner rims of which form guide surfaces 94, which have a conical upward and inward course with a conicity matching the conicity of the undeformed sealing lip 72. Together, the guide surfaces 94 in this way form a type of insertion funnel, which facilitates the placement of the filter element 4 onto the pipe socket 58.

As the filter element is placed and inserted into the guide formed by the channel section 82 of the opening 56 and by the sleeve 84, the radial projection of the end rim 96 of the sealing lip 72 decreases from the position shown in FIG. 2, such that, when placed in the position shown in FIG. 3, the sealing lip 72 uses an elastic sealing force to seal against the pipe socket 58. At the same time, the guide within the sleeve 84 forms the transverse force support for the end cap 32, and thus, of the filter element 4 on the stationary anchored pipe socket 58. The transverse force support can be provided for the lower end cap 32 as shown, but also for the upper end cap 18 or for both end caps 18, 32 if required.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having a cover part;
a replaceable filter element in being accommodated in the filter housing and having element material delimited at one end thereof by an end cap placed on a fluid channel;
a transverse force support supporting the filter element and being provided between the end cap and the fluid channel, the transverse force support supporting the filter element in relation to the fluid channel and engaging in an interior of the filter element at least partially at the one end, the transverse force support including a sleeve having a turned-in rim at one end of the sleeve and a perimeter wall as part of a guide for the fluid channel at another end of the sleeve; and
a bar-shaped annular flange formed at the outer circumference of the perimeter wall and engaging the end cap with a step-shaped recess.

2. The filter device according to claim 1 wherein the end cap comprises the transverse force support.

3. The filter device according to claim 1 wherein
the transverse force support is formed as an insert part connected to the end cap.

4. The filter device according to claim 1
the turned-in rim forms a stop body providing end stop for the filter element with respect to the fluid channel that is stationary.

5. The filter device according to claim 1 wherein
an inner diameter delimited by the turned-in rim is smaller than an inner diameter of the fluid channel in an area of a free end thereof.

6. The filter device according to claim 4 wherein
the one end of the element material facing the one end cap is in planar contact with a part of the end cap, adjacent to the step-shaped recess and the bar-shaped annular flange of the stop body.

7. The filter device according to claim 1 wherein
a further part of the guide has guide ridges projecting from the end cap, the guide ridges having conically converging guide surfaces pointing in a direction of a receiving opening in engagement with the fluid channel.

8. The filter device according to claim 1 wherein
the end cap has a circumferential sealing lip enclosing the fluid channel with a predeterminable contact force.

9. The filter device according to claim 8 wherein
the circumferential sealing lip, as a further part of the transverse force support, encloses the fluid channel as a seal with the predeterminable contact force and rests against the fluid channel.

10. The filter device according to claim 8 wherein
the circumferential sealing lip protrudes towards the interior of the filter element with a radial protrusion that decreases as the fluid channel engages the end cap.

11. The filter device according to claim 8 wherein
the circumferential sealing lip is an integral part of the end cap and is elastically flexible.

12. The filter device according to claim 8 wherein
a receiving opening in engagement with the fluid channel is delimited by the circumferential sealing lip.

13. The filter device according to claim 8 wherein
in an initial state before the fluid channel engages with the end cap, a free rim of the circumferential sealing lip has a smaller diameter than an outer diameter of the fluid channel.

14. The filter device according to claim 1 wherein
the end cap has a protruding sealing lip enclosing the fluid channel; and
guide ridges project from the end cap, the guide ridges having conically converging guide surfaces pointing in a direction of a receiving opening in engagement with the fluid channel, the guide surfaces and the protruding sealing lip have matching conicities.

15. A filter device, comprising:
a filter housing having a cover part;
a replaceable filter element in being accommodated in the filter housing and having element material delimited at one end thereof by an end cap placed on a fluid channel;
a transverse force support supporting the filter element and being provided between the end cap and the fluid channel, the transverse force support supporting the filter element in relation to the fluid channel and engaging in an interior of the filter element at least partially at the one end; and
guide ridges projecting from the end cap, the guide ridges having conically converging guide surfaces pointing in a direction of a receiving opening in engagement with the fluid channel.

16. A filter device, comprising:
a filter housing having a cover part;
a replaceable filter element in being accommodated in the filter housing and having element material delimited at one end thereof by an end cap placed on a fluid channel; and
a transverse force support supporting the filter element and being provided between the end cap and the fluid channel, the transverse force support supporting the filter element in relation to the fluid channel and engaging in an interior of the filter element at least partially at the one end;

a protruding sealing lip being on the end cap and enclosing the fluid channel; and guide ridges project from the end cap, the guide ridges having conically converging guide surfaces pointing in a direction of a receiving opening in engagement with the fluid channel, the guide surfaces and the protruding sealing lip have matching conicities.

\* \* \* \* \*